US009756784B2

(12) United States Patent
Boyle et al.

(10) Patent No.: US 9,756,784 B2
(45) Date of Patent: Sep. 12, 2017

(54) VEGETATION CUTTER WITH A DOCK FOR RECEIVING OBSTACLES

(71) Applicant: Slasher Teck Ltd, Merimbula, New South Wales (AU)

(72) Inventors: Nathan Boyle, Merimbula (AU); Norm Boyle, Merimbula (AU)

(73) Assignee: Slasher Teck Ltd., New South Wales (AU)

(*) Notice: Subject to any disclaimer, the term of this patent is extended or adjusted under 35 U.S.C. 154(b) by 0 days.

(21) Appl. No.: 15/389,863

(22) Filed: Dec. 23, 2016

(65) Prior Publication Data

US 2017/0172065 A1    Jun. 22, 2017

Related U.S. Application Data

(63) Continuation of application No. 15/187,495, filed on Jun. 20, 2016, now Pat. No. 9,560,801, which is a (Continued)

(30) Foreign Application Priority Data

Dec. 20, 2013    (AU) .................. 2013905001

(51) Int. Cl.
*A01D 34/86*    (2006.01)
*A01D 34/84*    (2006.01)
(Continued)

(52) U.S. Cl.
CPC ........... *A01D 34/84* (2013.01); *A01D 34/664* (2013.01); *A01D 34/81* (2013.01); *A01D 34/828* (2013.01);
(Continued)

(58) Field of Classification Search
CPC combination set(s) only.
See application file for complete search history.

(56) References Cited

U.S. PATENT DOCUMENTS 2,838,901 A    6/1958   Davis
3,241,302 A    3/1966   Barry
(Continued)

FOREIGN PATENT DOCUMENTS

DE    42 33 020 A1    4/1994
DK       2189054 T3    3/2012
(Continued)

OTHER PUBLICATIONS

International Bureau, Notification of the Recording of a Change for Application No. PCT/AU2014/050437, dated May 18, 2016.
(Continued)

*Primary Examiner* — Alicia Torres
(74) *Attorney, Agent, or Firm* — SoCal IP Law Group LLP; Guy L. Cumberbatch; Steven C. Sereboff (57) ABSTRACT

A vegetation cutter for cutting vegetation circumferent an obstacle. The vegetation cutter comprises a frame comprising a dock for receiving the obstacle; at least one cutter that is moveable in a cutting trajectory whereby vegetation circumferent a docked obstacle is cut; and a driver for moving the at least one cutter in the cutting trajectory. A method for cutting vegetation circumferent an obstacle.

19 Claims, 8 Drawing Sheets

Related U.S. Application Data continuation of application No. PCT/AU2014/050437, filed on Dec. 19, 2014.

(51) Int. Cl.
    *A01D 34/66*     (2006.01)
    *A01D 34/81*     (2006.01)
    *A01D 34/82*     (2006.01)
    *A01D 101/00*     (2006.01)

(52) U.S. Cl.
CPC ........ *A01D 34/863* (2013.01); *A01D 2101/00* (2013.01)

(56) References Cited

U.S. PATENT DOCUMENTS

| | | |
|---|---|---|
| 3,526,083 A | 9/1970 | Barry et al. |
| 3,535,861 A | 10/1970 | Fineman |
| 5,704,201 A | 1/1998 | Van Vleet |
| 6,301,863 B1 | 10/2001 | Liebrecht |
| 6,622,466 B1 * | 9/2003 | Ethier ............ A01B 33/02 172/24 |
| 7,363,754 B2 * | 4/2008 | Cartner ............ A01D 69/00 56/10.4 |
| 2006/0026938 A1 | 2/2006 | Cartner |

FOREIGN PATENT DOCUMENTS

| | | |
|---|---|---|
| EP | 2189054 B1 | 5/2010 |
| WO | 2015089588 A1 | 6/2015 |

OTHER PUBLICATIONS

International Preliminary Examining Authority, Notification of Transmittal of International Preliminary Report on Patentability for Application No. PCT/AU2014/050437, dated May 2, 2016.

International Searching Authority, Written Opinion of the International Searching Authority for Application No. PCT/AU2014/050437, dated Mar. 30, 2015.

Australian Patent Office/ International Searching Authority, International Search Report for Application No. PCT/AU2014/050437, dated Mar. 30, 2015.

European Patent Office, Extended European Search Report for Application No. 14871237.5, dated May 4, 2017.

\* cited by examiner

VEGETATION CUTTER WITH A DOCK FOR RECEIVING OBSTACLES

RELATED APPLICATIONS

The present application is a continuation of U.S. application Ser. No. 15/187,495 filed Jun. 20, 2016, which is a continuation of and claims the benefit of priority under 35 U.S.C. §120 to International Application No. PCT/AU2014/050437, filed Dec. 19, 2014, which in turn claims the benefit under 35 U.S.C. §119 to AU 2013905001, filed Dec. 20, 2013.

TECHNICAL FIELD

The present invention relates to a vegetation cutter for cutting vegetation and, in particular, to a vegetation cutter for cutting vegetation around an obstacle.

BACKGROUND ART

Roadsides in many countries must be lined with delineators (reflectors) at set intervals and traffic management signs (e.g. speed zone signposts) to guide drivers. These delineators and signs must be visible from a distance and hence cannot be covered by vegetation. Regular cutting of vegetation on roadside verges is therefore carried out to maintain appropriate sightlines, as well as to manage bushfire risk and to ensure that roadside vegetation does not impede water runoff after heavy storms.

Currently, vegetation on roadside verges is typically cut using a conventional slasher mounted on the back of a tractor. However, this arrangement does not allow for the cutting of vegetation close to delineator posts etc., with attempts to do so often resulting in damage or destruction of the posts. As such, it is often necessary for people to subsequently walk the route with whipper snippers and/or chemical vegetation spray management units to remove the remaining vegetation.

Mowers for cutting vegetation around posts and the like have been disclosed in the prior art. For example U.S. Pat. No. 3,241,302 discloses such a mower. However, such mowers are actuated by the post itself, as the mower moves past it, which can result in the post being damaged. It would be advantageous to provide alternative vegetation cutters for cutting vegetation around an obstacle.

It is to be understood that, if any prior art information is referred to herein, such reference does not constitute an admission that the information forms part of the common general knowledge in the art, in Australia or any other country.

SUMMARY OF THE INVENTION

In a first aspect, the present invention provides a vegetation cutter for cutting vegetation circumferent an obstacle. The vegetation cutter comprises a frame comprising a dock for receiving the obstacle; at least one cutter that is moveable in a cutting trajectory whereby vegetation circumferent a docked obstacle is cut; and a driver for moving the at least one cutter in the cutting trajectory.

In a second aspect, the present invention provides a method for cutting vegetation circumferent an obstacle. The method comprises manoeuvring a vegetation cutter of the first aspect of the present invention such that the obstacle is received in the dock; actuating the driver, whereby the at least one cutter moves in the cutting trajectory and vegetation circumferent the docked obstacle is cut; and manoeuvring the vegetation cutter such that the obstacle is no longer in the dock.

The vegetation cutter of the present invention can, in one operation, cut vegetation circumferent an obstacle. As will be appreciated, this is a significant improvement over the techniques discussed above that require a second (often relatively labour intensive) operation to remove such vegetation.

The vegetation cutter of the present invention also does not rely on relative movement with respect to the obstacle to cause cutting of the vegetation circumferent the docked obstacle. Instead, a driver is provided which, once the obstacle is safely docked, drives the cutter(s) such that vegetation circumferent the docked obstacle is cut. As such, the obstacle is not subjected to the often damaging forces which occur during use of prior art mowers that cut vegetation around posts and the like.

Vegetation cutters in accordance with the present invention are also likely to be more precise than prior art mowers, which rely on an operator accurately aligning post after post with an appropriate section of the mower, potentially whilst the mower is moving over rough ground. In the present invention, however, the obstacle is safely received in the dock and the circumferential cutting then started, which may allow for a closer positioning of cutter(s) to the obstacle. Furthermore, the longevity of prior art mowers would be expected to suffer due to the constant collisions between the mower and posts.

Vegetation cutters in accordance with the present invention are therefore not only alternatives to prior art mowers that cut vegetation around obstacles, but may also have a number of useful advantages over such mowers.

In some embodiments, the at least one cutter is moveable such that the cutting trajectory defines an arc around the docked obstacle. As would be appreciated, many tree trunks and roadside obstacles (for example) are generally circular in shape, and an arc-shaped cutting trajectory would enable a maximum amount of vegetation circumferent the obstacle to be cut.

In some embodiments, for example, the at least one cutter may be moveable in a first direction circumferent the obstacle, from a travelling configuration to a rotated configuration, and then in an opposite direction back to the travelling configuration. Alternatively, the at least one cutter may be moveable such that it circumnavigates the docked obstacle (i.e. it is rotatable through 360 degrees).

In some embodiments, the at least one cutter is moveable relative to the frame. Alternatively, the frame (or a portion of the frame) may move with the at least one cutter.

In some embodiments, the at least one cutter comprises first and second cutters. The first and second cutters may, for example, be located to either side of the dock. In some embodiments, the distance between the first and second cutters may be adjustable (e.g. in response to a width of the obstacle).

In some embodiments, the at least one cutter may further comprise a third cutter. As will be appreciated, in some cutter configurations of the first and second cutters (e.g. when they are located to either side of the dock), they will not overlap, and would otherwise leave a strip of uncut vegetation. The third cutter may, for example, be located in a position whereby it cuts vegetation at any underlap between the first and second cutters whilst in the travelling configuration.

In some embodiments (especially where the cutting trajectory defines an arc around the docked obstacle), the dock may be substantially centrally located on the frame. In some embodiments, the dock may be at the end of a channel in the frame (i.e. extending between a periphery of the frame and the dock). The channel may, for example, taper towards the dock in order to assist an operator to guide the obstacle into the dock.

In some embodiments, the driver comprises a roller adapted to abut the at least one cutter, whereby rolling of the roller moves the at least one cutter in the cutting trajectory.

In some embodiments, the driver may be actuated upon receipt of the obstacle in the dock. The actuation may, for example, be automatic once the obstacle is safely docked. Alternatively, the operator may need to manually start the driver, but this is only possible once the obstacle is safely docked.

In some embodiments, the at least one cutter depends from a member carried by the frame. The member may, for example, be rotatable relative to the frame, whereby rotation of the member causes the at least one cutter to move in the cutting trajectory. The member may, for example, be rotatable by the driver.

In some embodiments, the vegetation cutter may further comprise additional features such as height adjustment means (i.e. for adjusting the height of the at least one cutter from the ground) or a vehicle engagement for coupling the vegetation cutter to a vehicle (e.g. to the front of a vehicle such as a tractor, bobcat or the like).

BRIEF DESCRIPTION OF THE DRAWINGS

Notwithstanding any other forms which may fall within the scope of the present invention, specific embodiments of the invention will now be described, by way of example only, with reference to the accompanying drawings in which.

DESCRIPTION OF EMBODIMENTS

The present invention provides a vegetation cutter for cutting vegetation circumferent an obstacle. The vegetation cutter comprises a frame comprising a dock for receiving the obstacle; at least one cutter that is moveable in a cutting trajectory whereby vegetation circumferent a docked obstacle is cut; and a driver for moving the at least one cutter in the cutting trajectory.

The present invention also provides a method for cutting vegetation circumferent an obstacle. The method comprises manoeuvring a vegetation cutter of the present invention such that the obstacle is received in the dock; actuating the driver, whereby the at least one cutter moves in the cutting trajectory and vegetation circumferent the docked obstacle is cut; and manoeuvring the vegetation cutter such that the obstacle is no longer in the dock.

Primary advantages of the present invention over prior art vegetation cutting methods and mowers include a much greater efficiency than is the case for many of the techniques presently used to cut vegetation in locations where obstacles need to be mown around, along with a significantly reduced likelihood of damage to the obstacles compared with that when using equipment presently available. Other advantages of the present invention are disclosed herein and will be apparent to a person skilled in the art.

The vegetation cutter of the present invention is intended to cut vegetation surrounding obstacles such as poles, posts, barriers (e.g. as found on roadsides), trees (e.g. in orchards), vines (e.g. in wineries), and other obstacles commonly found in gardens, parks and the like. The vegetation cutter may also be used to cut vegetation where there is no obstacles (e.g. when slashing vegetation on the verge of a roadside in between roadside delineators, as will be described in further detail below).

The vegetation cutter of the present invention may be used to cut any vegetation of the type which routinely needs to be cut. Examples of such vegetation include grass, weeds and the like, which are commonly founds on roadsides around the world.

In use of the present invention, vegetation circumferent an obstacle is cut. A vast majority, if not substantially all, of the vegetation circumferent the obstacle is intended to be cut in accordance with the present invention. As will be appreciated, however, it may not be necessary (or appropriate) for all embodiments of the present invention to completely remove all of the vegetation surrounding an obstacle. In some applications, for example, it may be sufficient if a significant portion of the vegetation surrounding an obstacle is cut. For example, in an orchard, it would be preferable to leave a small amount of vegetation surrounding a tree trunk, rather than risk damaging the trunk with a cutting blade. It is within the ability of a person skilled in the art to consider relevant factors and make a decision regarding how much vegetation circumferent an obstacle can be cut, and how much can remain.

The vegetation cutter of the present invention would typically be associated with a vehicle which carries the vegetation cutter and enables it to be maneuvered relative to an obstacle. Suitable vehicles include tractors, bobcats or the like. In some embodiments, a dedicated vehicle may be provided equipped with the vegetation cutter. However, it would be more common for the vegetation cutter to be adapted for coupling to a suitable vehicle. Such a vehicle can then be used for other purposes, with the vegetation cutter only being attached when necessary. In such embodiments, the vegetation cutter may further comprise a vehicle engagement for coupling the vegetation cutter to a vehicle.

The vegetation cutter may be coupled to a vehicle in any suitable manner, using any of a variety of known mechanisms. The vegetation cutter may be coupled to the front, rear or sides of a vehicle, although the inventor recognises that it may not be desirable for an operator to have to keep turning around to monitor the vegetation cutter if it is behind the vehicle. Such constant turning means the operator spends a significant amount of time not facing in the direction of travel, which may cause hazards if vegetation on a roadside is being cut. Such constant turning may also be detrimental to the operator's health. As such the vehicle engagement is typically adapted to couple the vegetation cutter to the front of a vehicle, where it is constantly in the sight of the operator.

The vegetation cutter of the present invention comprises a frame comprising a dock for receiving the obstacle. The frame may have any form that is compatible with the vegetation cutter's intended use, as well as with any other features of the vegetation cutter. Typically, the frame will provide a cover that wholly encompasses the cutting trajectory of the at least one cutter such that there is no risk of an operator (or another person) accidentally being struck by a cutter (or hit with any debris struck by the cutter). Typically, other components of the vegetation cutter will depend from an underside of the frame.

The frame would typically remain substantially stationary once the obstacle has been received in the dock and whilst the at least one cutter is moving in the cutting trajectory. However, a portion of the frame (e.g. an inner portion of the frame) may also be capable of moving either along with or independently of the at least one cutter. This portion of the frame may, for example, be integrally formed with the at least one cutter and movement of this portion of the frame cause movement of the cutter in the cutting trajectory.

The frame may have fittings that enable other components to be attached to it. For example, it may be desirable for the vegetation cutter to include a means for preventing stones flicked up by the cutter(s) from flying out onto a roadway, and the frame may therefore include attachment points for short lengths of chain to dangle down and provide a screen to either block such projectiles or at least slow them down. It may also be desirable for the vegetation cutter to include height adjustment means for adjusting the height of the at least one cutter. Such height adjustment means may be provided attached to the frame, for example, in the form of one or more adjustable height wheels. The height of the at least one cutter (i.e. its distance from the ground) may be manually adjusted (e.g. using a winding handle) or automatically adjusted (e.g. by the operator or in response to operating parameters such as the angle or unevenness of the ground being mowed, etc.). These wheels may be positioned distal to any vehicle engagement in order to support the weight of the vegetation cutter and to lessen the torsional forces on the vehicle.

The frame may be formed of any suitable material, given its intended use, and would typically be formed from a corrosion resistant and durable metal.

The frame has a dock for receiving the obstacle. The dock may have any appropriate shape and configuration, provided that the obstacle is receivable therein. In use, the object may be received in the dock in any manner. Typically, however, the operator of the vegetation cutter will orient the obstacle with respect to the dock, and then drive the vegetation cutter towards the obstacle such that it is received in the dock.

The dock may, for example, be defined by the end of a channel which extends from a periphery to an interior of the frame. In use, the operator would align the channel with the obstacle and then drive the vegetation cutter towards the obstacle such that the obstacle passes through the channel and into the dock. The channel may, in some embodiments, be tapered towards the dock in order to facilitate this operation. Typically, the edges of the channel would be rounded in order to ensure that there was no chance of the obstacle catching on the frame. In some embodiments, the edges of the channel may be reinforced.

In some embodiments, the shape (e.g. the width) of the dock (and channel) may be adjustable in order for it to accommodate wider obstacles, or to more securely retain smaller obstacles (e.g. for more precise circumferential cutting, where the distances between the cutter(s) and obstacle would be less).

The dock may be located at any position on the frame, provided that movement of the at least one cutter in its cutting trajectory is effective to cut vegetation circumferent the docked obstacle (and ideally there being no risk of the cutter(s) contacting the obstacle). In some embodiments, and especially when the at least one cutter rotates around the docked obstacle, the dock is substantially centrally located on the frame.

In some embodiments, the dock may be adapted to securely receive the obstacle such that, once in position in the dock, the obstacle is held stationary with respect to the frame whilst the cutting operation is carried out. As would be appreciated, this would even further reduce the likelihood of damaging the obstacle, and would also provide a "fail safe" function, whereby the vegetation cutter cannot be moved until such time as the vegetation circumferent the object has been completely cut.

In order to securely receive the obstacle, the vegetation cutter may, for example, have a gate adapted to close once the obstacle is received in the dock. The gate may, for example, be hinged or otherwise pivot with respect to the frame to close once the obstacle is received in the dock.

The vegetation cutter of the present invention also has at least one cutter that is moveable in a cutting trajectory whereby vegetation circumferent a docked obstacle is cut. The at least one cutter may, for example, be moveable relative to the frame from a travelling configuration in a cutting trajectory whereby vegetation circumferent a docked obstacle is cut.

The vegetation cutter may include one or more cutters, depending on its intended use. For example, if the vegetation cutter is intended to trim vegetation around trees in an orchard, it may only need one cutter having a cutting trajectory that takes it around the outside of a docked tree trunk. However, vegetation cutters intended for use in slashing vegetation on a roadside would ideally be able to cut a wider path than would be feasible with just one cutter, and may therefore have two cutters (i.e. first and second cutters) spaced apart from each other. As two cutters that are laterally adjacent to each other (with respect to a direction of travel) would not be able to overlap with each other (at the same height, at least), if it is important that a strip of vegetation not be left, then a third cutter may also be provided to cut vegetation at any underlap between the first and second cutters whilst in the travelling configuration.

The cutter(s) (e.g. first, second and third cutters, etc.) are normally arranged in a travelling configuration, where they are capable of cutting vegetation (if actuated), but they do not interfere with the docking process of an obstacle. Upon actuation of the driver, however, the cutter(s) are moved from the travelling configuration in their cutting trajectory, and vegetation circumferent the docked obstacle is cut. Once the vegetation circumferent the obstacle has been cut, the cutter(s) return to their travelling configuration (i.e. so that the obstacle can be undocked).

The cutter(s) may be located at any position whilst in their travelling configuration, provided that they do not interfere with other components of the vegetation cutter (or, as noted above, any obstacle in the dock or which is in the process of being received in the dock). Ideally, when the vegetation cutter has two more cutters, the cutters in their travelling configuration will define a cutting zone that is as wide as possible, and which has no or very little underlap (i.e. which would leave a strip of uncut vegetation). Typically, in embodiments with two or more cutters (and especially when the cutters are rotatable relative to the frame), the first and second cutters are located to either side of the dock, with their cutting zones extending to the dock. Movement (e.g. rotation) of these cutters in the cutting trajectory causes them to circumnavigate the docked obstacle, with their blades being close enough to cut substantially all the vegetation around the obstacle, but not so close that they physically contact the obstacle.

The cutter(s) may have any known form, provided that they are operable to cut vegetation. In some embodiments, for example, each of the at least one cutter has a rotatable central shaft from which at least one, but typically two or more cutting blades project. The cutter may alternatively be a rotating disk having one, two, three or four cutting blades affixed thereto. In other embodiments, the cutter may comprise other means for cutting, such as scissor-action members, rotating flails or the like. In some forms, combinations of different cutters may be used, if such a combination provides an advantage.

The at least one cutter may also have a wire which is longer than the at least one cutting blade such that any residual vegetation circumferent the docked obstacle (i.e. which will not be reached by the cutting blade without risking damage to the obstacle) is trimmed. In this manner the cutting blade does the majority of the cutting, with the wire trimming any vegetation just out of reach of the blade. As would be appreciated, such a configuration may be appropriate in circumstances where it is necessary to cut substantially all of the vegetation circumferent an obstacle, but the obstacle could easily be damaged if impacted by (relatively heavy) a cutting blade. In some embodiments, the at least one cutter (or one of the cutters) may include only such a wire, although such a vegetation cutter may be less durable.

The at least one cutter may, in some embodiments, also have a guard adapted to bear against the docked obstacle and guide the cutter(s) about the obstacle whilst moving in the cutting trajectory. Again, this may help to prevent a cutting blade accidentally coming into contact with a docked obstacle, and especially if the obstacle has an irregular shape (e.g. as may be the case, for example, with tree trunks). The guard may, for example, be a metal ring located about the circumference of the circle defined by the spinning cutting blade.

The first and second (and third, etc.) cutters may be fixed in relation to each other (and the vegetation cutter). Alternatively, a distance between the first and second (etc.) cutters may be adjustable (e.g. in response to a width of the obstacle), for example, by providing a track along which the cutters can slide. Adjusting the distance between these cutters may be achieved using mechanical means (e.g. by unscrewing fasteners which hold the cutters in position, moving the cutters and refastening the fasteners) or automatic means (e.g. using a step motor).

The at least one cutter may be moved (e.g. with respect to the frame and starting from its travelling configuration) in its cutting trajectory (and back, if the cutter(s) do not completely circumvent the obstacle) using any suitable means. Typically, the at least one cutter will be moveable (e.g. rotatable relative to the frame) such that the cutting trajectory defines an arc around the docked obstacle, as such a movement is mechanically relatively easy to perform and many obstacles are generally circular in shape. It will be appreciated, however, that in other embodiments, cutting trajectories may include squares, ellipses, triangles or the like.

In embodiments where there are two or more cutters, the cutters may move in the same cutting trajectory (e.g. as is the case when they all depend from a single member), or each of the cutters may be independently moveable in its own trajectory, with the overall result being that vegetation circumferent the docked obstacle is cut. Each of the cutters may be independently operated, but would more typically be driven by the same drive system.

The at least one cutter may, for example, be moved in a first direction circumferent the docked obstacle from its travelling configuration to a rotated configuration, and then in an opposite direction back to the travelling configuration. In some embodiments, it may subsequently be necessary for the cutter to be moved in the opposite direction from the travelling configuration to a second rotated configuration, and then in the original direction back again to the travelling configuration in order for all of the vegetation circumferent the obstacle to be cut. Alternatively, the at least one cutter may be moveable such that it circumnavigates the docked obstacle (e.g. it rotates through 360 degrees relative to the frame).

Typically, the at least one cutter is moveable relative to the frame. That is, the frame of the vegetation cutter remains substantially stationary once the obstacle has been docked and whilst the at least one cutter moves from its travelling configuration through the cutting trajectory and back to the travelling configuration. As noted above, however, in some embodiments, a portion of the frame (e.g. an inner portion of the frame) may also be capable of moving with the at least one cutter. In such embodiments, the at least one cutter moves relative to the portion of the frame which remains stationary.

The at least one cutter may be coupled to any part of the vegetation cutter, provided that it can perform the functions described herein. In some embodiments, the at least one cutter may depend from a member carried by the frame. The member may have any shape and size, provided that it can interrelate with the frame (especially the dock) and other components of the vegetation cutter. Typically, the member will have a similar footprint to the frame (or at least an interior of the frame), and will be coupled to an underside of the frame. The member may, for example, be substantially planar and circular in cross section. The member may, for example, have a dock (and channel, if present) which is complimentary in shape to the dock (and channel) of the frame.

The member may be carried by the frame using any mechanism that enables the member to move in the manner required for the at least one cutter to move in the cutting trajectory. The member may, for example, be moveably coupled to the frame. In embodiments where the at least one cutter is rotatable relative to the frame, for example, the member may be rotatable relative to the frame and rotation of the member cause the at least one cutter to move in the cutting trajectory. Tracks or channels may be provided as necessary on the frame and/or member to achieve this functionality.

The member may, for example, be rotatably coupled to the frame at a periphery of the member. For example, the periphery of the member (or frame) may have a plurality of frame (or member) engagements for engaging the frame (or member). Such frame/member engagements enable the frame and member to rotatably move with respect to each other, preferably in as frictionless a manner as possible.

Examples of suitable frame/member engagements include ball bearings and rollers. Tracks or channels adapted to receive and retain such ball bearings and rollers may be provided on the other of the frame and member.

The vegetation cutter of the present invention also has a driver for moving the at least one cutter in the cutting trajectory. Any driver that is suitable for use in a vegetation cutter and which is capable of moving the cutter(s) in their cutting trajectory may be used. Suitable drivers may, for example, be actuated by electric or hydraulic motors and may include belts or chains, rollers etc.

In some embodiments, the driver includes a roller adapted to abut the at least one cutter, whereby rolling of the roller moves the at least one cutter in the cutting trajectory. In embodiments of the present invention where the vegetation cutter includes a member from which the at least one cutter depends, the member may be moveable (e.g. rotatable) by the driver. In such an embodiment, the driver may, for example, include a roller adapted to abut the member.

The driver may be actuated upon receipt of the obstacle in the dock. For example, the driver may be automatically actuated upon safe receipt of the obstacle in the dock. Alternatively, the driver may be disabled until such time as the obstacle is safely received in the dock, with the operator only being able to manually actuate it once the obstacle is docked in order to prevent accidental circumferential cutting before the obstacle is appropriately positioned.

In use, a vegetation cutter of the present invention may, in some embodiments, be manoeuvred such that the obstacle is received in the dock. Once this is achieved, the driver may be actuated such that it drives the at least one cutter in the cutting trajectory and vegetation circumferent the docked obstacle is cut. Typically, the frame of the vegetation cutter would remain stationary at this time. Once the vegetation circumferent the docked obstacle has been cut, the docking process can be reversed by the vegetation cutter manoeuvring such that the obstacle is no longer in the dock.

In another general form, disclosed herein is a vegetation cutter for cutting vegetation circumferent an obstacle, the vegetation cutter adapted for cutting vegetation within a cutting area at least partially circumferent the obstacle. Advantageously, the vegetation cutter is adapted to cut vegetation proximate an obstacle in an efficient manner, while avoiding contact with the obstacle.

Preferably, cutting means are adapted to travel along a cutting trajectory, the cutting trajectory at least partially defining the cutting area. Preferably, a portion of the trajectory defines a circumferential arc. Advantageously, the cutting trajectory circumscribes the obstacle allowing for the vegetation in the path of the trajectory to be cut.

Preferably, a cutter assembly is adapted for moving the cutting means along the cutting trajectory. Advantageously, the cutter assembly comprises means for moving the cutting means along the cutting trajectory, such as by using hydraulic motors, pulleys, drivetrains and the like.

Preferably, the cutter assembly is rotatable. Advantageously, the cutter assembly may be adapted to rotate traverse about the obstacle.

Preferably, the cutter assembly is rotatable from a resting configuration in a first direction and rotatable in a second direction to return to the resting configuration. Advantageously, the cutter assembly may be adapted to engage the obstacle in the resting configuration, cut about the obstacle in rotating in the first and second directions, and disengage the obstacle once returned to the resting configuration.

Preferably, the cutter assembly is rotatable through 360 degrees. Advantageously, the vegetation area is adapted to rotate entirely about the obstacle.

Preferably, the cutting means is adapted to travel with respect to the cutting assembly. Advantageously, the cutting means is adapted to move while the cutting assembly remains stationery. The cutting assembly may comprise guide rails defining a path through which the cutting means travel in the cutting process.

Preferably, the cutter assembly is substantially disk shaped.

Preferably, the cutter assembly is horizontally orientated. Advantageously, the horizontal alignment of the cutter assembly may allow the vegetation to be cut at a uniform height for the entire vegetation area.

Preferably, the cutter assembly comprises an obstacle accommodation adapted for at least partially accommodating the obstacle therein. Advantageously, the obstacle accommodation is located centrally of the vegetation cutter such that the vegetation cutter can receive the obstacle therein and cut about the obstacle. Preferably, the obstacle accommodation is adapted for securing the obstacle at an accommodated position and wherein the cutter assembly is adapted for rotating at least partially about the accommodated position. Advantageously, the obstacle may be secured within the obstacle accommodation. Preferably, the obstacle accommodation comprises a gate for securing the obstacle therein. Advantageously, the gate is adapted for securing the obstacle within the obstacle accommodation.

Preferably, the cutting means comprises at least one guide adapted to bear against the obstacle to guide the cutting means about the obstacle. Advantageously, the at least one guide is adapted for allowing the cutting means to locate close to the obstacle. Preferably, at least one guide comprises a roller. Advantageously, the roller reduces friction in the guiding of the cutting means about the obstacle.

Preferably, the vegetation cutter comprises a frame wherein the cutter assembly is rotatably coupled to the frame. Advantageously, the cutter assembly may be adapted to rotate freely while the frame remains stationary. Preferably, the cutter assembly is rotatably coupled to the frame at a periphery of the cutter assembly. Advantageously, the periphery frame is suited to applying rotational torque to the cutter assembly. Preferably, the periphery of the cutter assembly comprises at least one frame engagement for engaging the frame. Preferably, the frame engagement comprises a roller. Advantageously, the roller allows for the reduction of friction in the cutter assembly rotating relative to the frame. Preferably, the roller comprises teeth. Advantageously, the teeth allow for engaging the cutter assembly in applying rotational torque to the cutter assembly. Preferably, the roller is driven. Advantageously, the rotation of the cutter assembly may be automated.

Preferably, the cutting means comprises a first and a second cutter. Advantageously, an additional cutter allows for a greater cutting area. Preferably, in the first and the second cutter are offset by substantially 45 degrees.

Preferably, the cutting means further comprises a third cutter. Preferably, the third cutter is offset from the second cutter by substantially 45 degrees.

Preferably, the vegetation cutter further comprises height adjustment means for adjusting the height of the cutter assembly. Advantageously, the height adjustment means allows for the adjustment of the cutting height of the cutter assembly.

Preferably, the vegetation cutter further comprises a vehicle engagement for coupling the vegetation cutter to a vehicle. Advantageously, the vegetation cutter may be coupled to a driven vehicle, such as a tractor and the like.

Specific embodiments of vegetation cutters in accordance with embodiments of the present invention will now be described with reference to the Figures. It should be noted in the following description that the same reference numerals may be used when describing different embodiments to denote the same or similar features.

Figure 1:
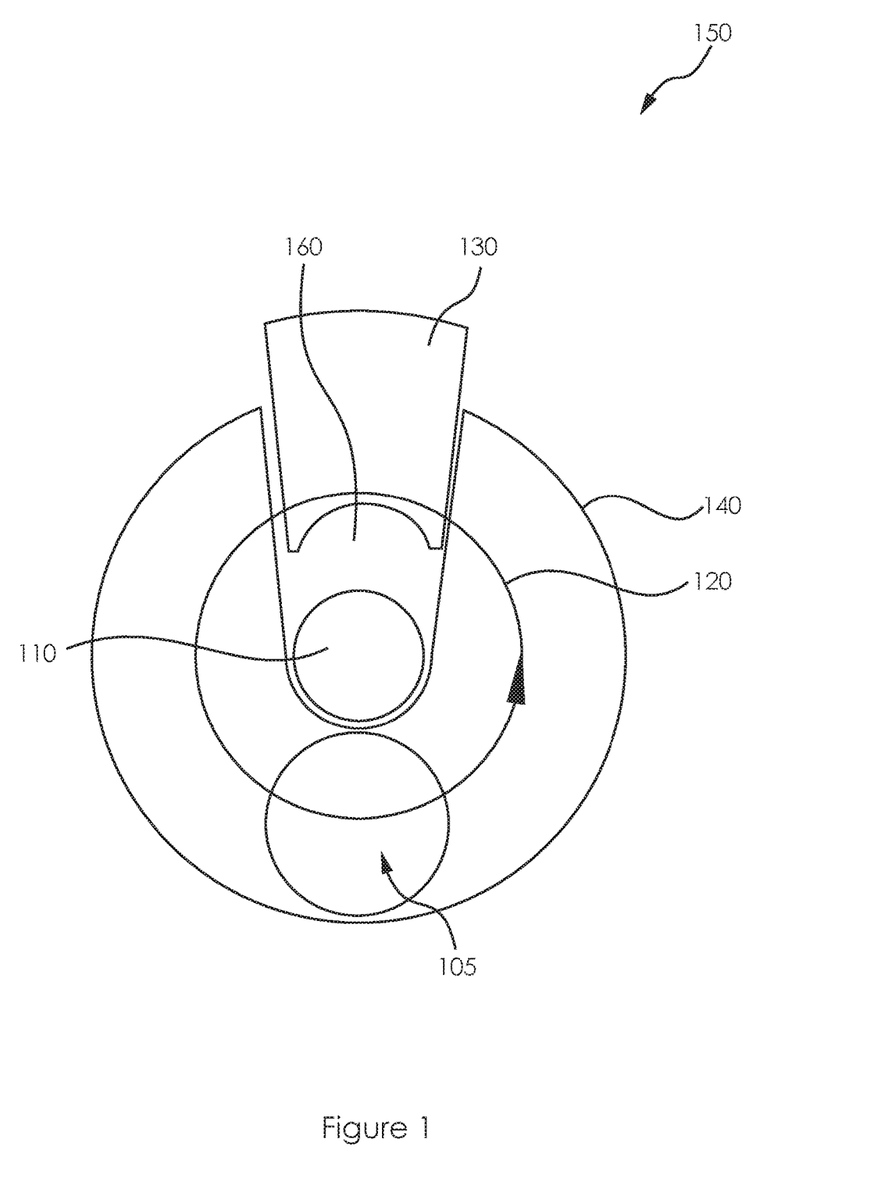
FIG. 1 shows a simplified top view of a vegetation cutter in accordance with a first embodiment of the present invention.

Referring firstly to FIG. 1, shown is a simplified form of a vegetation cutter 150 which is adapted for cutting vegetation at least partially circumferent an obstacle 110. The vegetation cutter 150 can be used to cut vegetation such as grass, weeds and the like, and is adapted to cut vegetation surrounding obstacles 110 such as poles, posts, barriers and trees such as those found in orchards, gardens, parks and the like.

The vegetation cutter 150 has a frame, which is schematically shown as frame 140, which is substantially disk shaped. However, in other embodiments, the shape of the vegetation cutter (or its frame) may be a cube, rectangular prism or the like. It will be appreciated that frame 140, as shown in FIG. 1 is shown in a simplified form and, as will be described below in respect of other embodiments, would normally include a number of other features such as a peripheral portion, wheels, supports, etc.

The vegetation cutter 150 also has at least one cutter in the form of a single cutter 105. In the embodiment shown, the cutter 105 is a rotating disk having cutting blades (not shown) affixed thereto. However, in other embodiments, the cutter 105 may comprise other means for cutting, such as scissor-action members, rotating flails or the like. The cutter 105 is adapted to travel along a cutting trajectory 120 which, in FIG. 1, is circular because the cutter 105 circumvents the obstacle 110. However, in other embodiments, cutting trajectories may comprise squares, ellipses, triangles or the like. The vegetation cutter 150 is typically substantially horizontally oriented (with respect to the ground) such that the cutter 105 is substantially parallel to the ground. In this manner, the vegetation is cut to a uniform height across the cutting area (i.e. the area defined by the frame 140 once the cutter 105 has moved through the cutting trajectory 120, or by the cutter 105 if the vegetation cutter 150 is moving forward with the cutter 105 in its travelling configuration, as shown in FIG. 1).

The vegetation cutter 150 also has a centrally located dock in the form of obstacle accommodation 160. A tapered channel leads from a periphery of the frame 140 to its centre, with the obstacle accommodation 160 being shaped to receive the obstacle 110 therein such that the frame 140 and the cutter 105 are able to rotate about to the obstacle 110, as will be discussed below.

Furthermore, the vegetation cutter 150 may comprise a gate assembly 130 wherein the obstacle 110 is secured within the vegetation cutter 150 by closing the gate assembly 130. The gate assembly 130 may be attached to the frame 140 through the use of hinges, latches or the like. As is shown in FIG. 1, the gate assembly 130 may move laterally into the closed configuration so as to allow a snug fit against the obstacle 110.

In the vegetation cutter 150, the gate assembly 130 is configurable in an open configuration for allowing the passage of the obstacle 110 therethrough, and in a closed configuration so as to allow for the securement of the obstacle 110 within the obstacle accommodation 160. The configuration of the gate may be automated by the control box 315 (see FIG. 2) where, upon sensing that an obstacle 110 has been received in the obstacle accommodation 160, the control box 315 causes the gate assembly 130 to close. Once a cutting operation has been completed by the cutter 105 (as described below), the control box 315 may cause the gate assembly 130 to open to release the obstacle 110. In certain embodiments (not shown), however, the gate may be detachable from the frame.

The cutter 105 is coupled to the frame 140 in any manner whereby the cutter 105 can be caused to move along (cutting any vegetation) the cutting trajectory 120 and circumvent the obstacle 110. In a first embodiment, the cutter 105 is fixed to the frame 140, and the frame 140 is adapted to rotate, for example, with respect to a stationary portion around the periphery of the frame (not shown). Rotation of frame 140 thus causes cutter 105 to move along the cutting trajectory 120. Alternatively, in a second embodiment, the frame 140 remains stationery and the cutter 105 is adapted to travel with reference to the frame 140 along the cutting trajectory 120.

In one form of the first embodiment, the frame 140 (and cutter 105) are rotatable from a travelling configuration (e.g. as shown in FIG. 1 with the opening for the obstacle accommodation 160 pointing forwards) in a first direction to a predetermined position, and then rotatable in a second direction to return to the travelling configuration. In this manner, the vegetation cutter 150 is adapted to engage the obstacle 110 while the cutter 105 is in its travelling configuration, and rotate in the first and second directions such that the cutter 105 is able to cut about the obstacle 110 before the frame 140 returns to its travelling configuration. As will be appreciated, in embodiments with only one cutter (e.g. as shown in FIG. 1), then it may be necessary for the frame 140 (and cutter 105) to perform another rotation, this time in the other direction, in order for the cutter 105 to cut all the vegetation circumferent the obstacle 110.

In an alternative form of the first embodiment, the frame 140 (and cutter 105) is rotatable through 360 degrees so as to return to its travelling configuration having circumvented the obstacle 110 by moving in one direction only.

Figure 2:
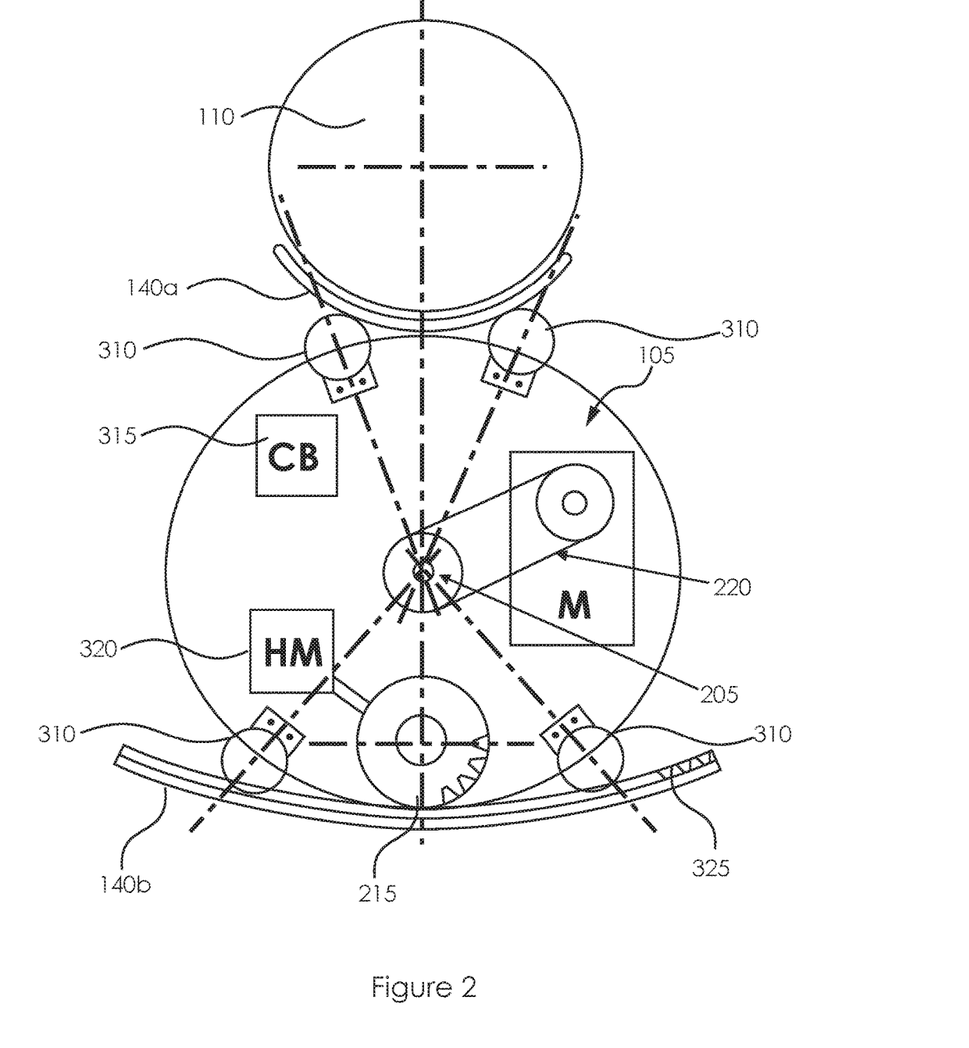
FIG. 2 shows a top view of the cutter of the vegetation cutter of FIG. 1 in greater detail.

In the second embodiment, the frame 140 is adapted to remain stationery, with the cutter 105 being adapted to travel with reference to frame 140, such as by being guided by rails and the like (see FIG. 2). Similar to the first embodiment, the cutter 105 may move from its travelling configuration in a first direction to a predetermined point and then rotate back the travelling configuration, or it may move through 360 degrees so as to return to its travelling configuration having circumvented the obstacle 110 by moving in one direction only.

The gate assembly 130 is more easily adapted for the first embodiment, wherein the frame 140 is adapted to rotate. However, the gate assembly 130 may also be used for the embodiment wherein the cutting means 105 is adapted to travel with respect to the frame. In this manner, the gate assembly 130 is adapted to complete the guide rails (as discussed below) when the gate assembly 130 is in the closed configuration so as to allow the passage of the cutter 105 therepast.

Referring now to FIG. 2, a more detailed view of cutter 105 is shown. In particular, FIG. 2 shows a top view of part of vegetation cutter 150, and in particular the drive mechanism for cutter 105. The rotating blades (not shown) of cutter 105 may be driven by a drive belt 220 and driveshaft 205 from a motor (e.g. a petrol or an electric motor M), for example. In FIG. 2, the upper portion of cutter 105 is shown as a circular plate, which protects the components thereon (e.g. as shown in this Figure) from cut vegetation, rocks and the like.

In the embodiment shown, the cutter 105 travels along its cutting trajectory by moving relative to the frame 140 in an arc-like trajectory around the obstacle 110. In this regard, an inner 140a and outer 140b periphery of frame 140 is provided with tracks or a channel into which is received one or more roller guides 310 mounted on the cutter 105. Movement of the cutter 105 in its trajectory may be driven by a hydraulic motor 320 adapted to drive a tooth roller 215 coupled to the cutter 105 and with its teeth against a corresponding tooth rack 325 in the outer 140b frame. The hydraulic motor 320 may be used to power the tooth roller 215 such that torque is applied to the corresponding tooth rack 325 thereby causing the cutter 105 to move along the frame outer periphery 140b and hence rotate around the obstacle 110. In other embodiments, however, the tooth roller 215 may be driven by other means including via an electrical motor, manual force and the like. The vegetation cutter 150 may also include an electronic control box 315 for automating the movement of the cutter 105.

In use, the cutter 105 is driven in its circumferential cutting trajectory when the tooth roller 215 is turned by the hydraulic motor 320. The cutter 215 will move around the obstacle 110 along the tracks/channels in the inner 140a and outer 140b peripheries of frame 140, thereby cutting vegetation circumferent the obstacle 110. Whilst these tracks do not continue over the obstacle accommodation 160 (not shown in FIG. 2), they may be provided as part of the gate assembly 130 (also not shown in FIG. 2) to complete the circle. Alternatively, the roller guides 310 mounted on the cutter 105 may be spaced such that they can span the gap in the tracks due to the obstacle accommodation, with a sufficient number of the cutter's roller guides 310 remaining in the tracks at all times to hold the cutter 105 stable.

Figure 3:
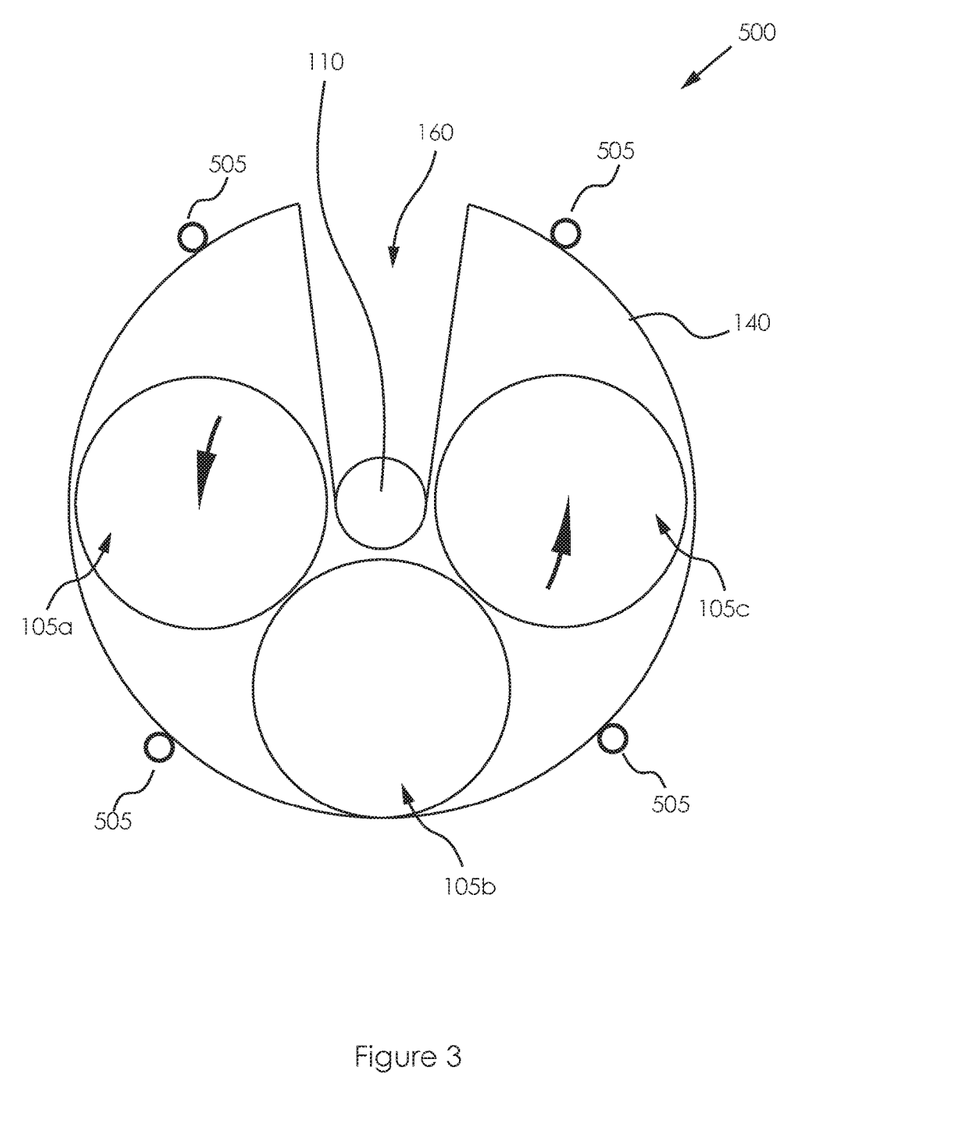
FIG. 3 shows a simplified top view of a vegetation cutter in accordance with a second embodiment of the present invention.

FIG. 3 shows a simplified form of a vegetation cutter 500 including at least one cutter in the form of cutters 105a, 105b and 105c. Cutters 105a and 105b are offset from one another by 90 degrees relative to the obstacle 110. Cutters 105c and 105c are offset from one another by 90 degrees relative to the obstacle 110. In alternative embodiments (not shown), the cutters 105a, 105b and 105c may be offset from each other by any angle, provided there is adequate distance between the cutters. Ideally, the cutters will be arranged to provide an optimal vegetation cutting configuration (as is the case in FIG. 3, where cutter 105b is positioned to cut vegetation that passes between cutters 105a and 105c when in the travelling configuration depicted in the figure).

Vegetation cutter 500 also has four height adjustment means 505, distributed equidistant about the frame 140. In alternative embodiments (not shown), the vegetation cutter may contain a different number of height adjusters. For example, when the vegetation cutter is mounted onto the front of a tractor, only two height adjusters at the front of the vegetation cutter may be required. The height adjustment means 505 may be adjustable in order to alter the distance between the cutters 105 and the ground, and comprise one or more wheels for engaging the ground.

Figure 4:
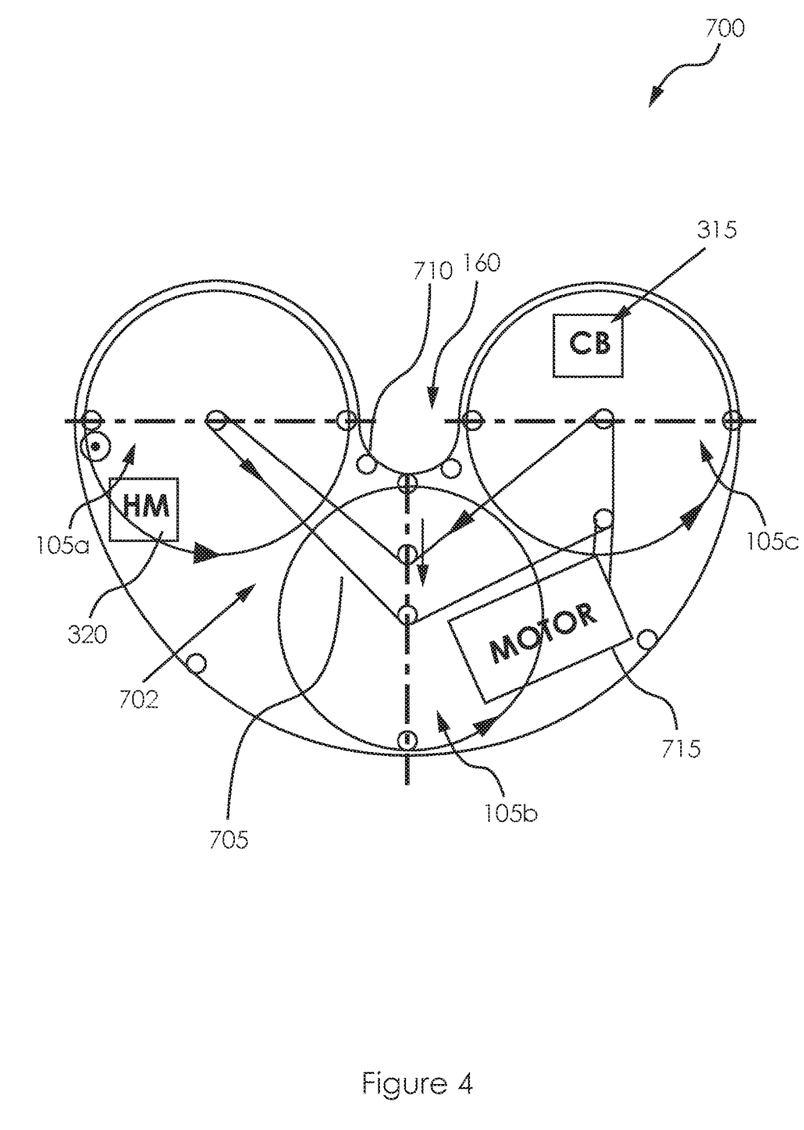
FIG. 4 shows the pulley system used to drive the cutters in the vegetation cutter of FIG. 3.

FIG. 4 shows a member in the form of cutter assembly 700 from which cutters 105a, 105b and 105c depend. Cutter assembly 700 may rotate with respect to the frame 140 (not shown in FIG. 4) of the vegetation cutter, in a manner similar to that described above (and below). The cutter assembly 150 may therefore include a control box 315 and hydraulic motor 320 for driving the rotation of the cutter assembly 700 (and hence cutters 105a, 105b and 105c) with respect to the frame/vegetation cutter.

Cutter assembly 700 has a drive belt system 702 for driving cutters 105a, 105b and 105c using a single motor 715. The system 702 has a communal drive belt 705 which drives a respective driveshaft of each of cutters 105a, 105b and 105c. The communal drive belt may alternatively be a drive chain or the like. The motor 715 may be electrically powered but is preferably a petrol motor. In embodiments where the vegetation cutter is adapted for coupling to a tractor, the communal drive belt 705 may be driven by an actuation mechanism of the tractor.

The cutter assembly 700 may also have one or more guides 710 adapted to bear against an obstacle (not shown in FIG. 4) so as to prevent or mitigate physical contact between cutter 105a, 105b or 105c and the docked obstacle. Preferably, the one or more guides 710 comprise rollers, such that the cutter assembly 700 may rotate about the docked obstacle in a substantially frictionless manner.

Figure 5:
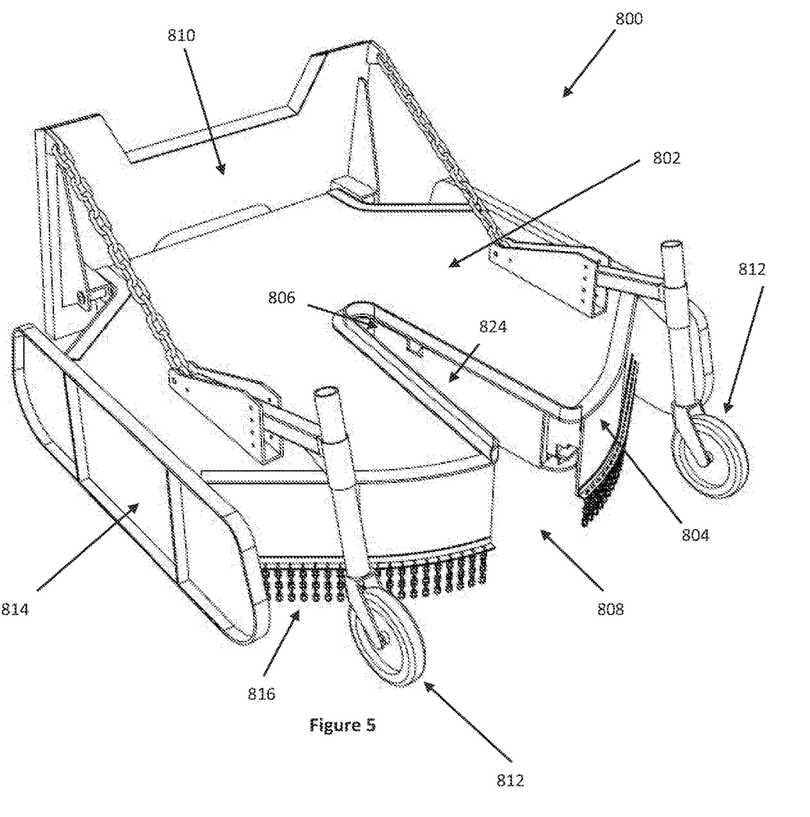
FIG. 5 shows a perspective view of a vegetation cutter in accordance with a third embodiment of the present invention.
Figure 6:
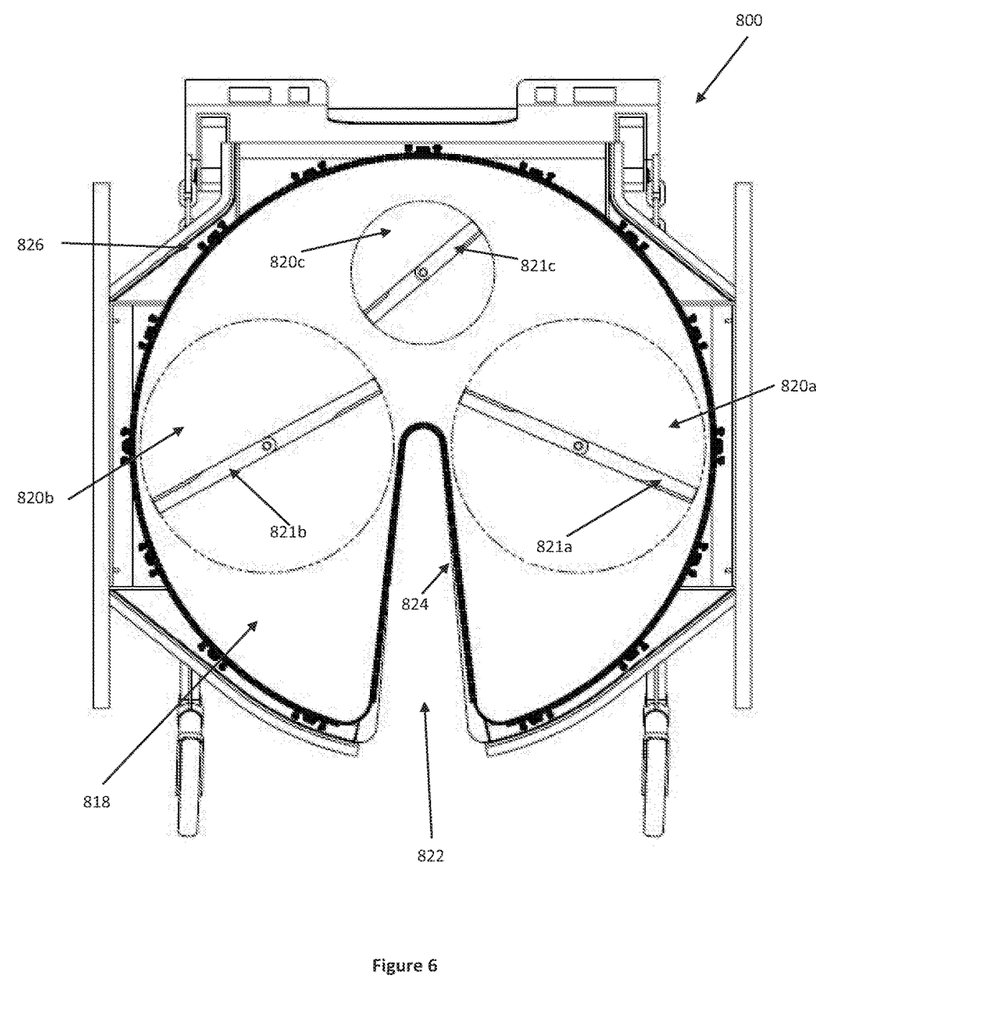
FIG. 6 shows a bottom view of the vegetation cutter of FIG. 5.
Figure 7:
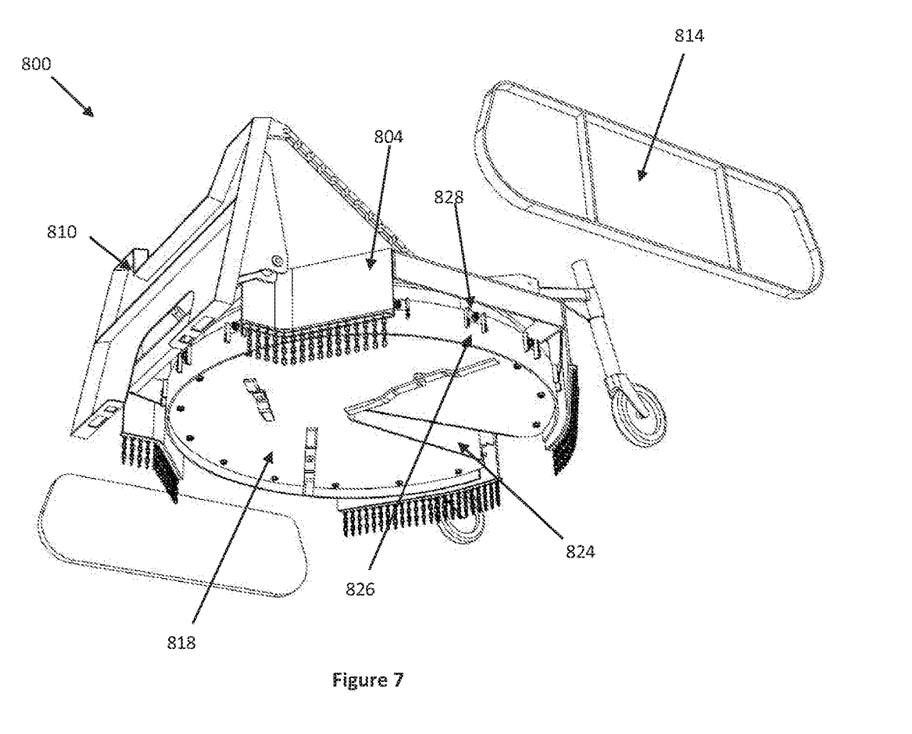
FIG. 7 shows a partially-exploded perspective view of the vegetation cutter of FIG. 5, from the underside.

FIGS. 5 to 7 show a vegetation cutter in accordance with a third embodiment of the present invention in the form of vegetation cutter 800. Vegetation cutter 800 has a frame 802, which is generally square in shape. Frame 802 has a skirt 804 which extends substantially around its periphery. Frame 802 also has a dock 806 which is located at the centre of the frame 802 and at the end of a tapering channel 808. Attached to frame 802 are a mounting assembly 810, via which vegetation cutter 800 can be mounted to a tractor, bobcat or the like (not shown), and two wheels 812, 812. Wheels 812, 812 support and stabilise the side of the vegetation cutter 800 distal to the tractor, and can also be used to adjust the height of the vegetation cutter 800. Also attached to frame 802 are skids 814, 814, which can help to prevent stones from being ejected sideways from the vegetation cutter, and dangling chains 816, which define a screen for preventing stones from being ejected from underneath the vegetation cutter (or at least slowing ejected stones down so that they are less likely to cause damage).

Vegetation cutter 800 also has a member in the form of rotating cutting assembly 818, from which at least one cutter in the form of cutters 820a, 820b and 820c depend. Cutters 820a, 820b and 820c each include a rotatable central shaft and cutting blades 821a, 821b and 821c, respectively. Rotation of the central shafts causes the cutting blades to cut any vegetation which they make contact with. Cutters 820a, 820b and 820c may either be independently actuated (e.g. via three separate motors), or may be actuated via a single motor and drive system such as that described above in respect of the second specific embodiment.

Member 818 is substantially planar and circularly shaped, and is slightly smaller than frame 802 (as can best be seen in FIG. 6). Although not shown in the Figures, the driving assembly, control boxes and the like are located on top of rotating cutting assembly 818 (underneath frame 802). Member 818 also has a channel 822 therethrough, which compliments tapering channel 808 and dock 806, with the sides of the channel having a wall 824 that defines a wall of the channel (and prevents cut vegetation etc. from easily getting into the space above the cutting assembly 818 and below the frame 802). When in the travelling configuration (as will be described below), channels 808 and 822 are substantially in alignment, and are ready to receive an obstacle therethrough.

Although not shown, wall 824 may also extend downwardly (in use) towards the ground, which provides a safety feature to prevent a person's hand or foot from being able to readily enter into a space where the cutters may be operating.

Rotating cutting assembly 818 is rotatable with respect to frame 802. A plurality of bearings 826 are provided around the periphery of cutting assembly 818, and these are adapted to rotatably couple with a complimentary track 828 provided underneath the frame 802. The ends of track 828 at either side of channel 808 are open so that, during rotation, a bearing 826 may exit track 828 on one side of the channel and then renter track 828 on the other side of the channel. As the vast majority of the bearings 826 will be in the track 828 at any given time during rotation, this is unlikely to destabilise the cutting assembly 818 to any significant extent.

Cutters 820a and 820b are positioned either side of the dock 806 and, as the cutting assembly 818 is rotated, will cut any vegetation circumferent an obstacle held in the dock 806. In the travelling configuration (discussed below), a strip of vegetation about as wide as the dock will not be cut by cutters 820a and 820b, and a third cutter 820c is therefore provided to cut vegetation at this underlap.

FIGS. 8A-8G shows the sequence of events via which a slasher 900, which has a vegetation cutter 800 attached to its front, cuts vegetation circumferent a roadside post 902.

Figure 8A:
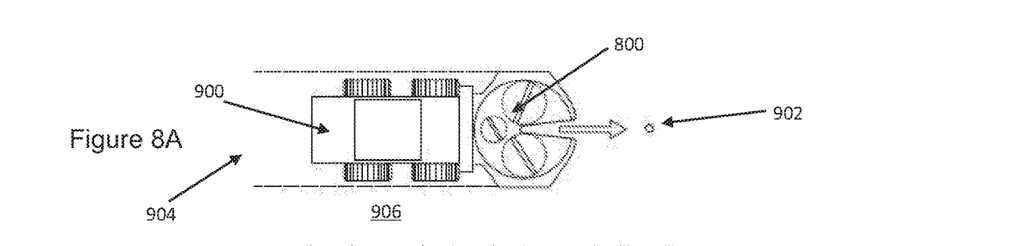
FIGS. 8A-8G show the sequence of events via which the vegetation cutter of FIG. 5 cuts vegetation circumferent an obstacle.

In FIG. 8A, the slasher 900 cuts a strip of vegetation 904 adjacent a roadside 906 up to the post 902. Vegetation is cut because cutters 820a, 820b and 820c are in their travelling configuration and are all spinning at a rate whereby vegetation which makes contact with blades 821a, 821b and 821c (see FIG. 6) is cut.

Figure 8B:
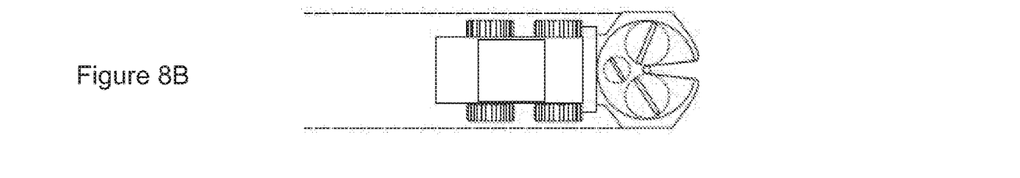

In FIG. 8B, the slasher 900 is driven onto the post 902 such that the post passes through tapering channel 808 to the dock 806 its end, and then stopped.

Figure 8C:
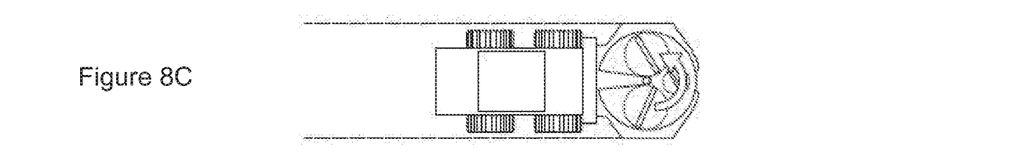

In FIG. 8C, whilst the slasher 900 remains stationary and the post 902 safely positioned in the dock 806, the rotating cutting assembly 818 is caused to rotate with respect to frame 802. This rotation causes the cutters 820a and 820b to rotate in an arc circumferent the post 902, cutting any vegetation which makes contact with blades 821a and 821b. Once the leading cutter has been rotated far enough around the post 902 that all vegetation circumferent the post has been cut then, in FIG. 8D, the rotating cutting assembly 818 is caused to rotate back to its travelling configuration.

Figure 8D:
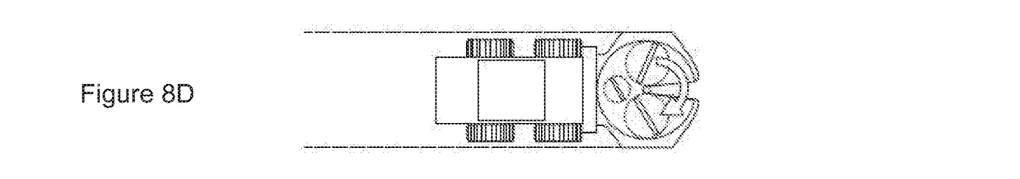

It should be noted that the steps shown in FIGS. 8C and 8D may be performed in other ways. For example, in some embodiments, the rotating cutting assembly may rotate by 360 degrees to come back to the travelling configuration. Alternatively, the rotating cutting assembly may rotate part way around the post in a first direction, and then in an opposite direction, past the travelling configuration and around the post until all vegetation circumferent the post has been cut, before finally rotating back (in the first direction) to the travelling configuration.

Figure 8E:
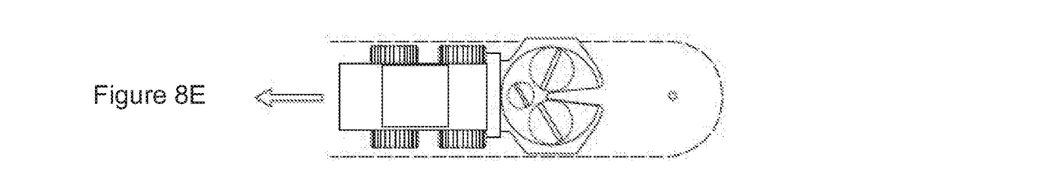
Figure 8F:
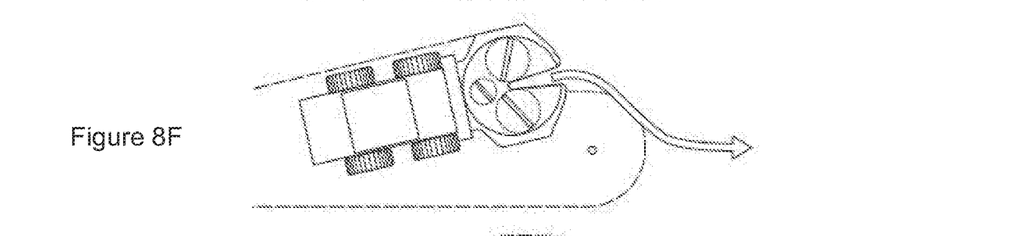
Figure 8G:
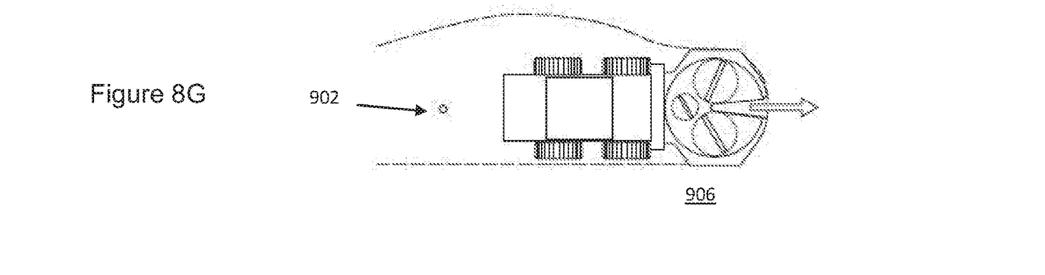

In FIG. 8E, the slasher 900 disengages from the post 902 by reversing away from it until the post exits the channel 808 and the slasher is able to manoeuvre around the post 902 (in FIG. 8F). In FIG. 8G, the slasher 900 continues along the side of the road 906, cutting vegetation as it goes, until it reaches the next post (not shown), whereupon the process is repeated.

It will be appreciated that numerous advantages can be provided by specific examples of vegetation cutters in accordance with embodiments the present invention. Such advantages include (but are not limited to):

It engages the post during the normal slashing process and cuts the grass immediately around the reflector post or traffic management post.

It removes the need for whipper snipper manual labour for the removal of vegetation around the post, thus saving considerable labour costs.

It reduces or removes the need for chemical spraying around posts as the cutting of the vegetation around the posts can be performed each and every time the general area of the verge is cut, thus saving considerable cost and improving environmental outcomes.

It substantially eliminates the risk of damage to and destruction of posts, saving money on repairs, replacement and maintenance, and ensuring that posts are always operating to the relevant standards.

It substantially reduces WHS (Workplace Health and Safety) issues for tractor operators by being capable of being mounted on the front of the tractor rather than the rear. The vast majority of the operator's functions therefore take place in front of rather than behind the operator.

It substantially reduces road carriageway incursion during the slashing process by engaging the post head on and not having to manoeuvre the rear mounted slasher around the post, which is often onto the carriageway.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Those of skill in the art will appreciate that numerous modifications or changes can be made to the particular embodiments described above without departing from the scope of the invention. All such modifications and changes are intended to be included within the scope of the appended claims.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the vegetation maintenance industries.

The invention claimed is:

1. A vegetation cutter for cutting vegetation circumferent an obstacle, the vegetation cutter comprising:
   an outer frame comprising an outer channel that extends between an opening at a periphery of the outer frame and a dock configured to receive an obstacle thereat;
   a single inner member comprising an inner channel, the inner member being rotatably moveable relative to the outer frame such that the inner and outer channels are alignable, whereupon the obstacle is receivable at the dock by advancing the vegetation cutter;
   at least one cutter that depends from the inner member; and
   a driving motor operable to move the inner member relative to the outer frame, whereby the at least one cutter is moved in a cutting trajectory and vegetation circumferent a docked obstacle is cut.

2. The vegetation cutter of claim 1, wherein the at least one cutter is moveable such that the cutting trajectory defines an arc around the docked obstacle.

3. The vegetation cutter of claim 1, wherein the at least one cutter is moveable in a first direction circumferent the docked obstacle from a travelling configuration to a rotated configuration, and then in an opposite direction back to the travelling configuration.

4. The vegetation cutter of claim 1, wherein the at least one cutter comprises first and second cutters, and wherein the first and second cutters are located to either side of the dock.

5. The vegetation cutter of claim 4, wherein the at least one cutter further comprises a third cutter.

6. The vegetation cutter of claim 1, wherein the at least one cutter comprises a rotatable central shaft from which at least one cutting blade projects.

7. The vegetation cutter of claim 6, wherein the at least one cutter further comprises a guard adapted to bear against the docked obstacle and guide the at least one cutter about the obstacle whilst moving in the cutting trajectory.

8. The vegetation cutter of claim 7, wherein the at least one cutter further comprises a wire which is longer than the at least one cutting blade such that any residual vegetation circumferent the docked obstacle is trimmed.

9. The vegetation cutter of claim 1, wherein the dock is substantially centrally located on the outer frame.

10. The vegetation cutter of claim 1, wherein the outer channel tapers towards the dock.

11. The vegetation cutter of claim 1, wherein the dock is adapted to securely receive the obstacle.

12. The vegetation cutter of claim 1, wherein the driving motor comprises a roller adapted to abut the inner member, whereby rolling of the roller moves the inner member.

13. The vegetation cutter of claim 1, wherein the driving motor is actuated upon receipt of the obstacle in the dock.

14. The vegetation cutter of claim 1, wherein the inner member is rotatable relative to the outer frame, whereby rotation of the inner member causes the at least one cutter to move in the cutting trajectory.

15. The vegetation cutter of claim 1, wherein the inner member is substantially planar and circular in cross section.

16. The vegetation cutter of claim 1, wherein the inner member is rotatably coupled to the outer frame at a periphery of the inner member.

17. The vegetation cutter of claim 16, wherein the periphery of the inner member comprises a plurality of frame engagements for engaging the outer frame.

18. The vegetation cutter of claim 1, wherein the outer frame further comprises a vehicle engagement for coupling the vegetation cutter to a vehicle.

19. A method for cutting vegetation circumferent an obstacle, comprising:
   manoeuvring the vegetation cutter of claim 1 such that the obstacle is received in the dock;
   actuating the driving motor, whereby the at least one cutter moves in the cutting trajectory and vegetation circumferent the docked obstacle is cut; and
   manoeuvring the vegetation cutter such that the obstacle is no longer in the dock.

* * * * *